(12) United States Patent
Yang et al.

(10) Patent No.: US 10,649,067 B1
(45) Date of Patent: May 12, 2020

(54) SIMULTANEOUS TRANSMIT AND RECEIVE (STAR) SUBSYSTEM WITH EXTERNAL NOISE CANCELLER

(71) Applicant: NORTHROP GRUMMAN SYSTEMS CORPORATION, Falls Church, VA (US)

(72) Inventors: Jeffrey M. Yang, Signal Hill, CA (US); Eric B. Nakamura, Torrance, CA (US); A. Dale Parker, Rancho Palos Verdes, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 542 days.

(21) Appl. No.: 15/335,283

(22) Filed: Oct. 26, 2016

(51) Int. Cl.
*G01S 7/02* (2006.01)
*G01S 13/02* (2006.01)

(52) U.S. Cl.
CPC ....... *G01S 7/023* (2013.01); *G01S 2013/0245* (2013.01)

(58) Field of Classification Search
CPC ...... G01S 7/023; G01S 7/2813; G01S 7/2928; G01S 7/36; G01S 2013/0236;
(Continued)

(56) References Cited

U.S. PATENT DOCUMENTS 6,882,836 B2  4/2005  Wilcox
7,202,812 B2  4/2007  Krikorian et al.
(Continued)

FOREIGN PATENT DOCUMENTS

EP        2880771 A1 *  6/2015
WO    WO 2013/095386 A1  6/2013
WO    WO 2015/022348 A1  2/2014

OTHER PUBLICATIONS

Choi, Yang-Seok, "Simultaneous Transmission and Reception: Algorithm, Design and System Level Performance" IEEE Transactions on Wireless Communications, Sep. 22, 2013, pp. 1-20.
(Continued)

*Primary Examiner* — Peter M Bythrow
(74) *Attorney, Agent, or Firm* — John A. Miller; Shumaker, Loop & Kendrick, LLP (57) ABSTRACT

A wideband simultaneous transmit and receive (STAR) subsystem for a radar or communications system including self-interference cancellation and external noise cancellation. The STAR subsystem includes a canceller circuit which digitally prepares a cancellation signal to cancel out leaked or reflected portions of the transmit signal and correlated noise in the receiver signal. The self-interference cancellation can be adaptively configured in a closed-loop mode, and operated open loop in real time to minimize bandwidth limitations and achieve wideband performance. The STAR subsystem also includes an external noise active canceller which greatly diminishes high-power external noise in the receiver signal. The external noise canceller digitally synthesizes a cancellation signal which dramatically improves the signal-to-noise ratio in the receiver. Together, the combined cancellation techniques prevent receiver saturation and preserve receiver sensitivity.

20 Claims, 7 Drawing Sheets

(58) Field of Classification Search
CPC ..... G01S 2013/0245; G01S 2013/0254; G01S 13/5246; G01S 13/526; G01S 13/5265; G01S 7/03; G01S 7/038; H04B 1/56
See application file for complete search history.

(56) References Cited

U.S. PATENT DOCUMENTS

| | | | |
|---|---|---|---|
| 7,633,435 B2 | 12/2009 | Meharry et al. | |
| 7,801,493 B2 | 9/2010 | Do | |
| 7,817,641 B1 | 10/2010 | Khandani | |
| 7,855,617 B2 | 12/2010 | Cheung et al. | |
| 8,135,356 B2 | 3/2012 | Shirakabe et al. | |
| 8,199,681 B2 | 6/2012 | Zinser et al. | |
| 8,233,412 B1 | 7/2012 | Abbey et al. | |
| 8,300,561 B2* | 10/2012 | Elahi | H04L 5/1423 370/278 |
| 9,331,735 B1* | 5/2016 | Margomenos | H04B 1/525 |
| 9,985,772 B1* | 5/2018 | Johnson | H04B 1/525 |
| 2003/0098806 A1* | 5/2003 | Green | H03D 7/16 341/144 |
| 2007/0085727 A1* | 4/2007 | Backes | G01S 7/038 342/68 |
| 2009/0207072 A1* | 8/2009 | Hong | G01S 7/032 342/194 |
| 2011/0159801 A1 | 6/2011 | Maltsev et al. | |
| 2012/0155336 A1 | 6/2012 | Khojastepour et al. | |
| 2013/0114468 A1 | 5/2013 | Hui et al. | |
| 2013/0215805 A1 | 8/2013 | Hong et al. | |
| 2013/0301488 A1* | 11/2013 | Hong | H04B 1/56 370/278 |
| 2014/0028491 A1* | 1/2014 | Ferguson | G01S 13/882 342/122 |
| 2014/0348018 A1* | 11/2014 | Bharadia | H04L 5/1461 370/252 |
| 2015/0155899 A1* | 6/2015 | Webb | H04B 1/525 455/303 |
| 2016/0209494 A1* | 7/2016 | Mazzaro | G01S 7/032 |
| 2017/0085398 A1* | 3/2017 | Liu | H04L 5/0048 |
| 2017/0104268 A1* | 4/2017 | Ford | H01Q 21/0025 |
| 2018/0013466 A1* | 1/2018 | Kim | H04B 15/02 |
| 2018/0106884 A1* | 4/2018 | Marr | G01S 7/292 |
| 2018/0358997 A1* | 12/2018 | Shekhar | H04B 1/40 |

OTHER PUBLICATIONS

Bharadia, Dinesh, "Full Duplex Radios" SIGCOMM 13, Aug. 12-16, 2013 Hong Kong, China, 12 pgs.

Gerber, Daniel L. "Adaptive Transmit Beamforming for Simultaneous Transmit and Receive" Paper Submitted on Apr. 28, 2011, 121 pgs.

Choi, Jung II, "Achieving Single Channel, Full Duplex Wireless Communication" MobiCom, 10, USA Sep. 20-24, 2010, 12 pgs.

* cited by examiner

SIMULTANEOUS TRANSMIT AND RECEIVE (STAR) SUBSYSTEM WITH EXTERNAL NOISE CANCELLER

BACKGROUND

Field

This invention relates generally to a simultaneous transmit and receive communications system and, more particularly, to a wideband simultaneous transmit and receive (STAR) subsystem for radar or other applications, where the STAR subsystem includes a transmit-interference canceller circuit which cancels out reflected and leaked portions of the transmit signal in the receiver signal, and also includes an external noise canceller circuit which diminishes high power external noise signals to improve received signal-to-noise ratio.

Discussion

The use of radar systems has increased dramatically in recent years—including military, commercial and consumer applications. In all of these applications, there is strong motivation to increase system performance and reduce system cost, mass and packaging space. These same improvement requirements also apply to communications systems and any other type of two-way transceiver systems.

In any application where simultaneous transmission and reception of signals (full duplex operation) is desired, both transmit and receive circuitry will be operating at the same time. Such a system is simple to build if the transmit (Tx) and receive (Rx) circuitry operate using separate antennas or are using different time-frequency-code resources. If the Tx and Rx systems must share a single antenna and the same time-frequency combinations, then a circulator is usually inserted to isolate the Tx and Rx signal paths and prevent the high power Tx signal from leaking into and blinding the receiver. Unfortunately, the isolation provided by the circulator by itself is insufficient, especially in beam forming arrays where antenna active impedance can dramatically worsen the effective isolation with scan angle.

There are three types of waveforms produced by Tx circuitry which may be problematic for the receiver: (1) the transmit signal itself, (2) correlated/predictable noise (for example output noise from a Digital to Analog Converter) and (3) uncorrelated/unpredictable noise, mainly "thermal noise" or amplification noise which varies with temperature. Isolation between the Tx and Rx channels is needed which is effective in minimizing all three of these undesirable components of the Tx signal in the Rx signal.

In addition, continued operation of a radio transceiver in the presence of external noise—whether intentional unfriendly "jamming" or incidental noise such as a television broadcast signal—poses a significant challenge. A transceiver design is needed which can effectively handle the challenge of high power external noise signals.

DETAILED DESCRIPTION OF THE EMBODIMENTS

The following discussion of the embodiments of the invention directed to a wideband simultaneous transmit and receive (STAR) subsystem is merely exemplary in nature, and is in no way intended to limit the invention or its applications or uses.

In a simultaneous transmit and receive (STAR) system, a radio transmitter and receiver operate simultaneously through a common antenna aperture while utilizing the same time-frequency resources, thus reducing the number of antennas needed per transceiver module from two (one for transmit and one for receive) to one. The benefits of STAR are many, including reduced cost and form factor, which may be critical for certain applications.

One major challenge in implementing a STAR system is that the high power transmit signal and its associated noise will leak into the highly sensitive receiver which can either saturate or damage the low noise amplifier (LNA) in the receiver and, even if the LNA is not damaged, the leakage waveforms will completely overwhelm the desired receive signal.

The invention described herein utilizes digital cancellation to cancel out the transmit signal and correlated noise, which are predictable. Additionally, this invention utilizes a combination of digital and analog techniques to suppress and cancel uncorrelated "thermal" noise, which is unpredictable. Together, the combined cancellation techniques prevent receiver saturation and preserve receiver sensitivity to match the performance of a non-STAR (two antenna) system. The digital cancellation of the transmit signal works in the time domain rather than in the frequency domain, and is run open loop in real time to minimize band limitations and achieve wideband performance. This invention can be implemented with discrete components, as a system-on-chip, or as any combination thereof. It can also be used as a single transmit/receive (TR) unit or in array format for radar, communications, or any application where simultaneous transmit and receive is desired.

Figure 1:
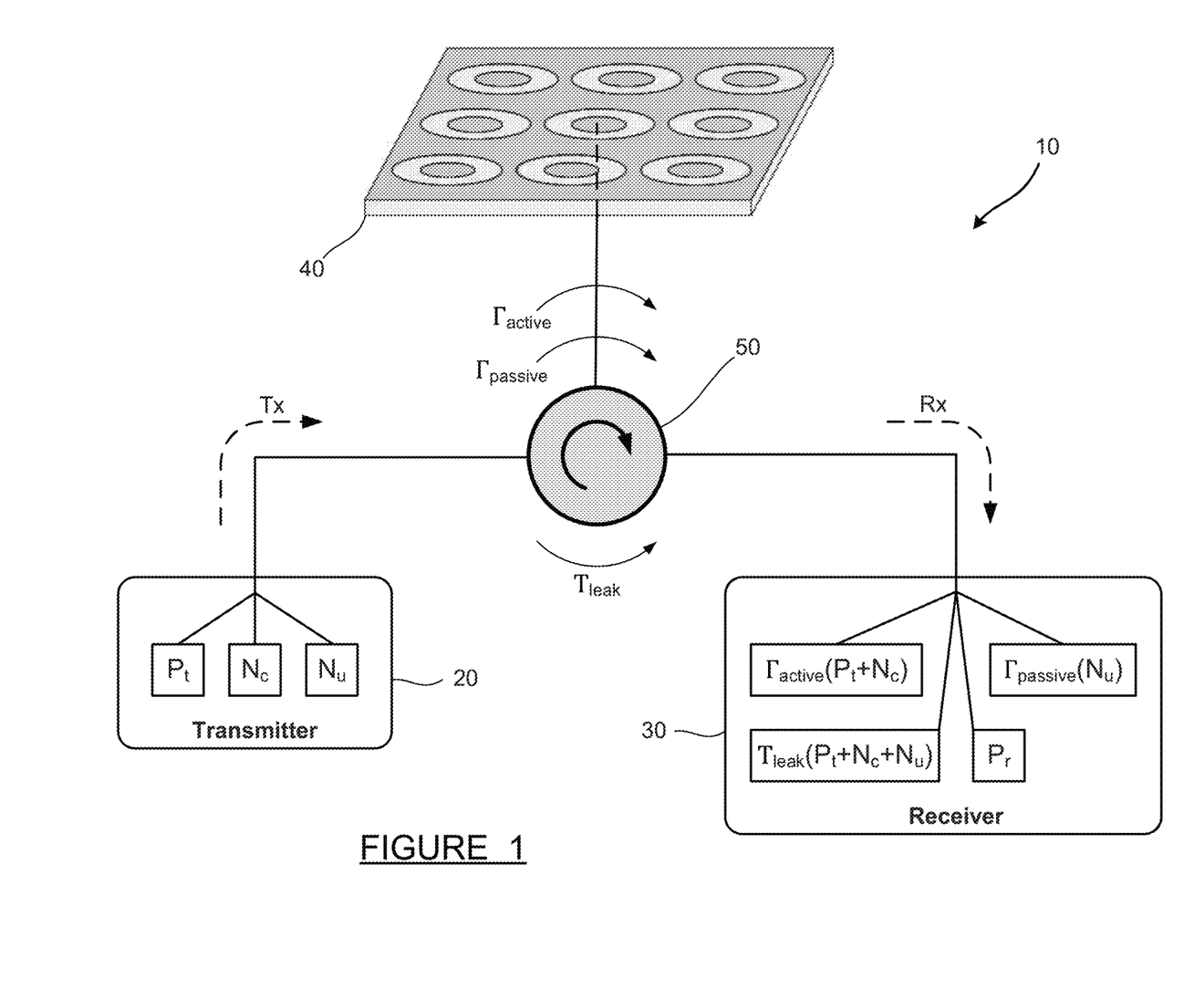
FIG. 1 is a conceptual illustration of a typical simultaneous transmit and receive (STAR) system showing how components of a transmit signal can detrimentally pass through to a received signal.

FIG. 1 is a conceptual illustration of a typical simultaneous transmit and receive (STAR) system 10 showing how components of a transmit signal can detrimentally pass through to a received signal. A transmitter 20 and a receiver 30 operate in a fashion which would be understood by those familiar with radio transceivers. The transmitter 20 delivers a signal, such as a radar signal, for broadcast by an antenna 40. The transmit signal can be considered to consist of three components; $P_t$ is the actual desired transmitted signal power; $N_c$ is the correlated noise power, which is the noise power which can be correlated to the frequency and amplitude of the desired transmitted signal; and $N_u$ is the uncorrelated noise power, sometimes called "thermal noise" because it is amplification noise which varies based on temperature of the circuitry.

By definition for any simultaneous transmit and receive system such as the STAR system 10, the receiver 30 shares the antenna 40 with the transmitter 20. In order to facilitate this sharing, a circulator 50 is used. The circulator 50 is a three-port ferromagnetic, passive device used to control the direction of signal flow in the system 10, where the direction of rotation (and signal flow) is indicated by the arrow in the circulator 50.

The circulator 50 creates rotating magnetic fields which influence the transmitted and received signals. The rotary field is very strong and will cause any signals in the frequency band of interest at one port to follow the magnetic flow to the adjacent port and not in the opposite direction. Thus, when the transmitter 20 sends a signal, the output goes directly to the antenna 40 and is isolated from the receiver 30. Similarly, all signals from the antenna 40 go to the receiver 30 and not the transmitter 20 because of the circular signal flow.

Good isolation is key to the effectiveness of the circulator 50, to ensure that the high-power transmitter output signal does not get back the receiver 30. However, it is not possible for the circulator 50 to perfectly isolate the transmit signal from the receiver 30. It is inevitable that some portion of the transmit signal will find its way to the receiver 30, due either to leakage or to reflection. $T_{leak}$ is a transmission coefficient related to circulator isolation, and designates the portion of the transmit signal which will leak through to the receiver 30. The leakage signal includes all components of the transmit signal, and thus, $T_{leak}$ applies to $P_t$, $N_c$ and $N_u$.

The antenna 40 will also reflect some portion of the transmit signal back to the circulator 50, where it will be directed to the receiver 30. $\Gamma_{active}$ is a reflection coefficient corresponding to the array active impedance for the correlated signal, and designates one portion of the transmit signal which will be reflected back to the receiver 30. The active reflection signal includes the components of the transmit signal which are correlated to the desired transmission, and thus, $\Gamma_{active}$ applies to $P_t$ and $N_c$. In addition, $\Gamma_{passive}$ is a reflection coefficient corresponding to the array input impedance for the uncorrelated signal, and designates another portion of the transmit signal which will be reflected back to the receiver 30. The passive reflection signal includes the component of the transmit signal which is uncorrelated to the desired transmission, and thus, $\Gamma_{passive}$ applies only to the uncorrelated noise power $N_u$.

In addition to the components related to $T_{leak}$, $\Gamma_{active}$ and $\Gamma_{passive}$, the received signal will include $P_r$, which is the actual desired receive signal power. In the typical STAR system 10, the leaked and reflected portions of the transmit signal—that is, the components related to $T_{leak}$, $\Gamma_{active}$ and $\Gamma_{passive}$—will either damage the receiver 30 or overwhelm the actual desired receive signal $P_r$. These problems have prevented the effective use of simultaneous transmit and receive systems for high power applications such as radar, especially where electronically steerable beam forming arrays are used and antenna impedance can dramatically worsen the effective isolation of the circulator 50 with scan angle.

Figure 2:
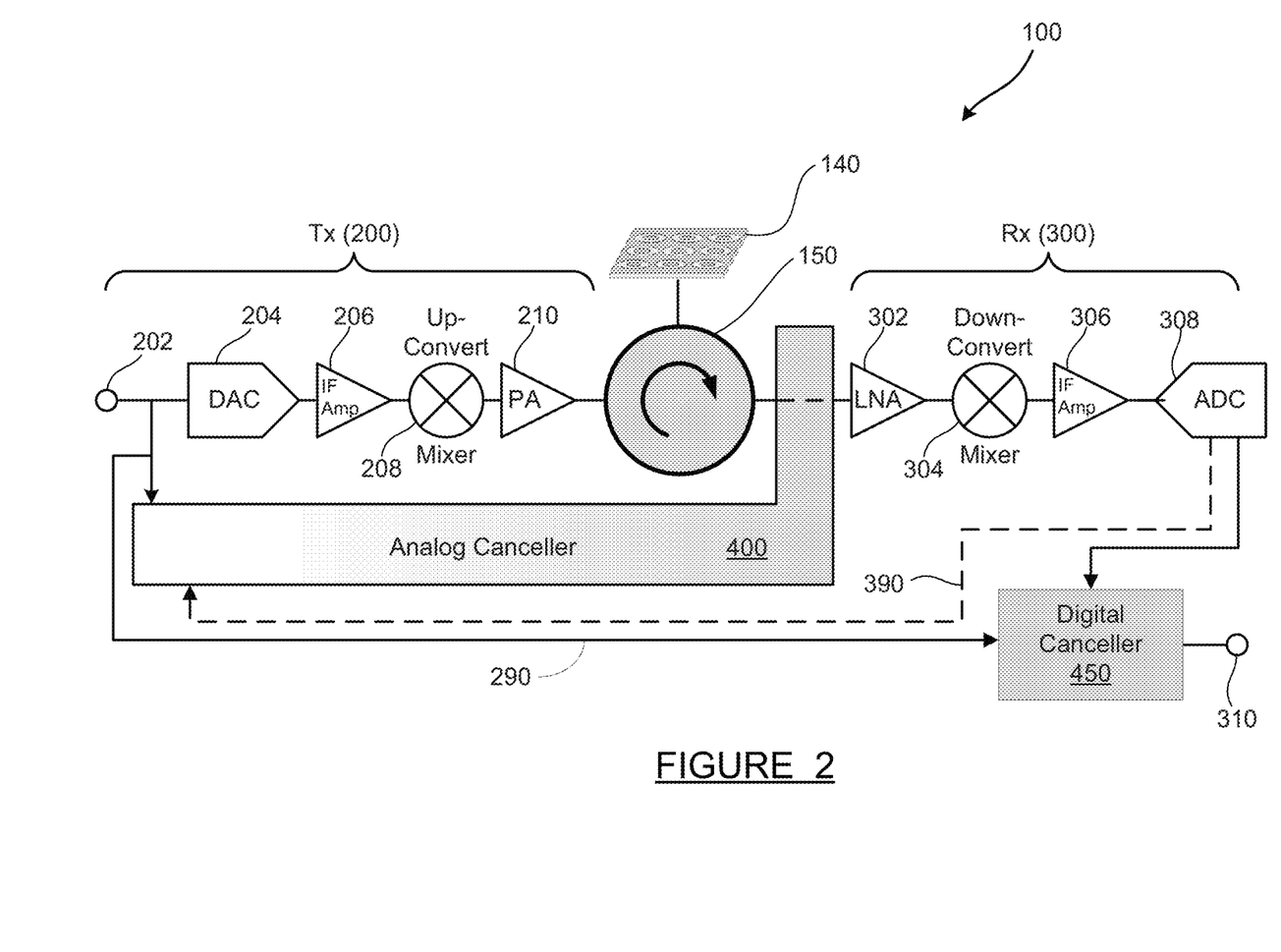
FIG. 2 is a block diagram of a STAR subsystem which minimizes transmit signal degradation of the received signal.

FIG. 2 is a block diagram of a STAR subsystem 100 which minimizes transmit signal degradation of the received signal. The STAR subsystem 100 includes a transmitter (Tx) 200 and a receiver (Rx) 300, where the transmitter 200 and the receiver 300 share an antenna 140 by way of a circulator 150. The functions of the transmitter 200, the receiver 300, the antenna 140 and the circulator 150 are as described above for the typical STAR system 10 of FIG. 1. The STAR subsystem 100 includes an analog canceller 400, which modifies the received signal immediately downstream of the circulator 150, before the signal is processed by the receiver 300. The term "analog canceller" is used in this disclosure because the noise cancellation is applied to the radio frequency (RF) received signal in the analog domain; however, as will be described below, the cancellation signal in the analog canceller 400 is prepared digitally. The STAR subsystem 100 also includes a digital canceller 450, which modifies the received signal downstream of the analog receiver components, in the digital domain, before the final digital signal is output from the STAR subsystem 100. The functions of the analog canceller 400 and the digital canceller 450 are discussed below.

In a simplified representation, the transmitter 200 receives at input terminal 202 a desired transmit signal in digital form. The digital transmit signal is converted to analog at digital-to-analog converter (DAC) 204. The analog transmit signal is amplified at the intermediate frequency (IF) amplifier 206. The amplified IF signal is up-converted to a radio frequency (RF) signal at mixer 208, and the RF signal is amplified at power amplifier (PA) 210. The amplified RF signal from the PA 210 is provided to the circulator 150, where it passes on (clockwise) to the antenna 140. The correlated and uncorrelated noise—$N_c$ and $N_u$, respectively—are picked up in the transmit signal $P_t$ as it passes through the DAC 204, the IF Amp 206, the up-convert mixer 208 and the PA 210.

The receiver 300 receives a signal from the antenna 140 via the circulator 150 and amplifies the received RF signal in a low-noise amplifier (LNA) 302. The amplified RF signal is down-converted to intermediate frequency at mixer 304. The IF signal is amplified at IF Amp 306, and the final analog received signal is converted to digital at analog-to-digital converter (ADC) 308.

Figure 3:
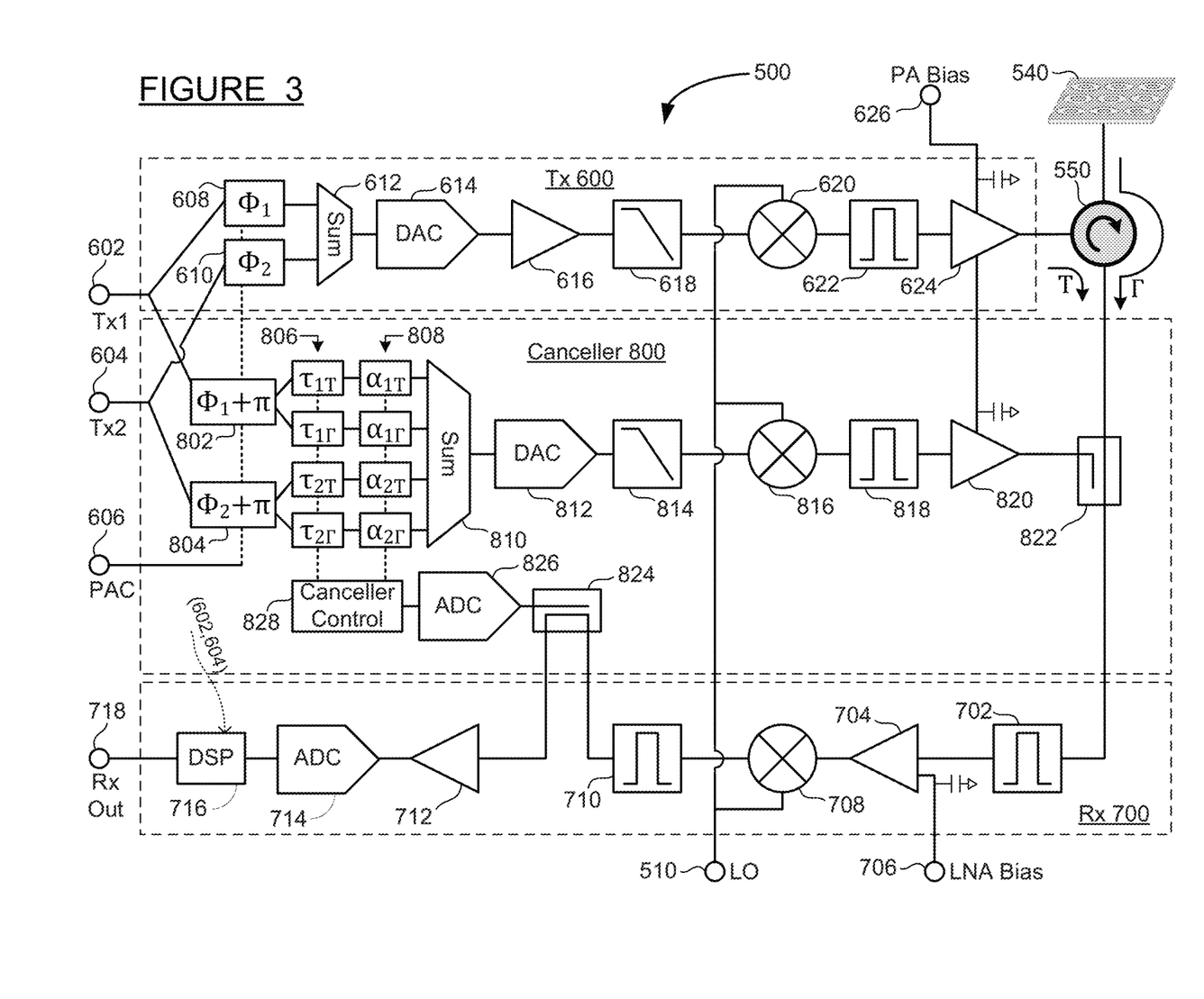
FIG. 3 is a circuit diagram showing details of one embodiment of the STAR subsystem.

The analog canceller 400 operates by taking the digital form of the transmit signal at the input terminal 202 and creating a signal which is designed to attenuate the portions of the transmit signal which are leaked or reflected into the received signal. The analog canceller 400 creates the cancellation signal based on the transmit power $P_t$ and the correlated noise $N_c$, using three different tuning steps. First, the transmit power $P_t$ is phase-shifted by 180 degrees, so that the cancellation signal is opposite, not additive to, the transmit signal. Second, the leaked and reflected components of the transmit power $P_t$ and the correlated noise $N_c$ are separately adjusted by a true time delay, where the true time delay represents the time elapsed during the leakage or reflection of the transmit signal. Finally, the leaked and reflected components are separately adjusted by an amplitude scale factor, where the scale factors designate the amount of the signals which are leaked and reflected back to the receiver 300, and are represented by $T_{leak}$ and $\Gamma_{active}$, respectively. Details of an embodiment of the analog canceller 400 are shown in FIG. 3 and discussed below.

The STAR subsystem 100 adds the synthesized cancellation signal from the analog canceller 400 to the received signal from the circulator 150, before the received signal is processed by the receiver 300. By fine tuning both time shift and amplitude for the leaked and reflected components separately, the analog canceller 400 can synthesize with considerable accuracy a cancellation signal which cancels the transmit power and correlated noise which is either leaked or reflected into the receive signal.

The analog canceller 400 also receives feedback from the receiver, via a feedback loop 390 from the ADC 308. In a calibration process using the feedback from the ADC 308, the analog canceller 400 can adjust the true time delays and the amplitude scale factors for the leaked and reflected components separately in order to optimize the quality of (minimize the transmit signal feedback in) the received signal. This feedback calibration process may be performed in a "pre-mission" phase, where the calibration values are stored as a function of temperature in a look-up table. Then, live operations of the STAR subsystem 100 can be run in an open-loop mode in order to maximize wideband performance.

The digital canceller 450 picks up the digital form of the transmit signal from the input terminal 202 on line 290. The digital canceller 450 prepares a cancellation signal which can be applied to the output of the ADC 308, to produce a final digital receiver signal at output terminal 310. Details of an embodiment of the digital canceller 450 are also shown in FIG. 3 and discussed below.

FIG. 3 is a circuit diagram of a STAR subsystem 500, which is a detailed embodiment of the STAR subsystem 100 shown in block diagram form in FIG. 2. The STAR subsystem 500 includes a transmitter circuit (Tx) 600, a receiver circuit (Rx) 700 and an analog canceller circuit 800, along with an antenna 540 and a circulator 550, as discussed previously.

The STAR subsystem 500 can be used in a phased array system, where more than one transmit signal can be handled by the transmitter circuit 600, and the antenna 540 is a phased array. A phased array is an array of antennas in which the relative phases of the respective signals feeding the antennas are varied in such a way that the effective radiation pattern of the array is reinforced in a desired direction and suppressed in undesired directions. For example, phased array antennas are used in 3-dimensional radar applications, where different signal phases are used for different altitudes/elevation angles. As will be described in the discussion below, the STAR subsystem 500 is capable of being used with "millimeter wave" multi-beam, simultaneous transmit and receive, electronically steerable radar systems, operating across the full electromagnetic (EM) spectrum.

A first digital transmit signal Tx1 is provided on input terminal 602, and a second digital transmit signal Tx2 is provided on input terminal 604. A phased array controller (PAC) 606 communicates with phase-shifters 608 and 610, where the digital transmit signals Tx1 and Tx2, respectively, are phase-shifted. The phase-shifted digital transmit signals are combined at sum operator 612, and the summed digital transmit signals are converted to analog at digital-to-analog converter (DAC) 614. The intermediate frequency (IF) analog signal is amplified at IF Amp 616, and the signal is then passed through low-pass filter 618.

The IF signal is up-converted to radio frequency (RF) at mixer 620, which also receives a frequency input signal from local oscillator (LO) 510 (for example, to raise the transmit signal from an IF of 1 GHz to an RF of 41 GHz using a 40 GHz LO). The RF transmit signal is sent through band-pass filter 622, and amplified at power amplifier (PA) 624, which also receives a signal from PA Bias 626. At this point, the signal is in analog form, at radio frequency, cleaned up, amplified and ready to be transmitted. The signal is provided to the array antenna 540 by way of the circulator 550, in the manner described previously.

Ignoring the analog canceller 800 for a moment, the receiver 700 receives an RF signal from the antenna 540 by way of the circulator 550, where the received signal includes not only the desired receiver signal power $P_r$, but also the leakage component T and the reflection component Γ. The RF received signal is filtered by band-pass filter 702, amplified at low noise amplifier (LNA) 704, to which a bias is applied at LNA Bias 706. The RF received signal is down-converted to IF at mixer 708, again using frequency input from the local oscillator 510. The IF received signal is filtered by band-pass filter 710 and amplified at IF amplifier 712. The IF analog received signal is then converted to digital at ADC 714, processed by a digital signal processor (DSP) 716 and output at Rx output terminal 718. The DSP 716 corresponds to the digital canceller 450 of FIG. 2. The DSP 716 performs a final noise cancellation in the digital domain to produce the output Rx signal. The DSP 716 receives input from the transmit terminals 602 and 604. The DSP 716 may be programmed to cancel remaining noise from the transmit signal—such as uncorrelated "thermal noise"—out of the receive signal, using a correlator to adjust an adaptive filter for example.

As discussed previously, the analog canceller 800 prepares a cancellation signal to combine with the RF received signal before the received signal is processed by the receiver 700. The analog canceller 800 applies its cancellation signal to the received signal immediately downstream of the antenna 540 and circulator 550, while the received signal is in the analog domain. However, the analog canceller 800 prepares the cancellation signal (self-cancelling transmit-generated noise) using high precision digital techniques as discussed below.

The analog canceller 800 includes phase shifters 802 and 804, which receive the signals Tx1 and Tx2 and apply the phase shifts based on input from the phased array controller 606, and further shift the signals by 180 degrees (π radians) to produce a digital cancellation signal which is out of phase with, not additive to, the transmit signal (i.e., destructive interference). The phase-shifted cancellation signals are provided first to a set of true time delay tuners 806 and then to a set of amplitude tuners 808. As shown in FIG. 3, the tuners 806 and 808 include a separate tuner for leakage and for reflection, for each of the two transmit signals, for a total of four true time delay tuners 806 and four amplitude tuners 808.

The true time delay tuners 806 adjust the cancellation signals by time delays which represent the amount of time it takes for the transmit signal to either leak or reflect back to the receiver 700. Because leakage and reflection may take different amounts of time, a separate tuner is provided for the leakage than for the reflection. That is, for input signal Tx1, two true time delay tuners 806 are provided, $\tau_{1T}$ (for leakage) and $\tau_{1\Gamma}$ (for reflection). Similarly, for input signal Tx2, two true time delay tuners 806 are provided, $\tau_{2T}$ (for leakage) and $\tau_{2\Gamma}$ (for reflection).

In a similar manner, the amplitude tuners 808 adjust the cancellation signals by amplitude scale factors which represent the fraction of the transmit signal which will either leak or reflect back to the receiver 700. Because leakage and reflection coefficients may be different, a separate tuner is provided for the leakage than for the reflection. That is, for input signal Tx1, two amplitude tuners 808 are provided, $\alpha_{1T}$ (for leakage) and $\alpha_{1\Gamma}$ (for reflection). Similarly, for input signal Tx2, two amplitude tuners 808 are provided, $\alpha_{2T}$ (for leakage) and $\alpha_{2\Gamma}$ (for reflection).

It is important to understand what is being done here. A cancellation signal is being prepared which is individually fine-tuned for each component of transmit-signal interference which is anticipated in the received signal. Components of each input signal for the multi-beam array are separately time-delay-tuned and amplitude-tuned, for both leakage and reflection, in order to produce a cancellation signal which precisely targets the input signal and the correlated noise in the received signal. This cancellation signal tuning is performed digitally, so as to achieve the most precise cancellation signal.

The cancellation signals from the four amplitude tuners 808 are combined at sum operator 810, and the summed digital cancellation signals are converted to analog at digital-to-analog converter (DAC) 812. The intermediate frequency (IF) analog cancellation signal is then passed through low-pass filter 814.

The synthesized IF cancellation signal is up-converted to radio frequency (RF) at mixer 816, which also receives the frequency input signal from the local oscillator (LO) 510. The RF cancellation signal is sent through band-pass filter 818, and amplified at power amplifier (PA) 820, which also receives the bias voltage signal from PA Bias 626. At this point, the cancellation signal is in analog form, at radio frequency, cleaned up, amplified and ready to be combined with the primary received signal from the circulator 550 at coupler 822. As discussed in detail above, the cancellation signal is precisely targeted at cancelling the leakage and reflection interference which is created by or correlated to the transmit signal.

After the cancellation signal is combined with the primary received signal at the coupler 822, the modified received signal which is processed by the receiver 700 contains much less self-interference than would otherwise exist. Specifically, if the tuners 806 and 808 are tuned properly, the transmit power $P_t$ and the correlated noise $N_c$ will be cancelled from leaked and reflected components of the received signal. Thus, the modified received signal is a much higher quality signal than the unmodified primary signal from the circulator 550.

The uncorrelated or "thermal" noise, $N_u$, can be addressed through a three-part approach—including minimizing generation of thermal noise, minimizing transmission of thermal noise and mitigating received thermal noise. First, the generation and amplification of thermal noise in the transmitter 600 can be minimized through selection of the DAC 614 and the PA 624. In particular, the PA 624 should be implemented as a wideband, low noise power amplifier, such as a solid state power amplifier (SSPA) with an output power rating of at least 35 decibel-milliwatts (dBm). Second, leakage of thermal noise from the transmitter 600 to the receiver 700 can be minimized by using a high isolation circulator for the circulator 550, such as an integrated nanowire magnetic circulator. Third, the thermal noise received by the receiver 700 can be mitigated through proper selection of the low noise amplifier 704. Specifically, the LNA 704 could be implemented as a differential low noise amplifier to provide common mode noise rejection of at least 35 dB. Furthermore, the LNA 704 is preferably a Gallium-Nitride (GaN) device, which can withstand input power greater than 30 dBm, far greater than other types of low noise amplifiers.

As discussed previously, the true time delay tuners 806 can be adjusted to provide the expected time delay based on parameters of the antenna 540 and the circulator 550 which can be determined, and the amplitude tuners 808 can be adjusted to provide the expected amplitude scale factor based on the transmission coefficient T of the circulator 550 (for leakage) and the reflection coefficient Γ of the antenna 540 (for reflection). It is also possible to fine-tune the tuners 806 and 808 using feedback from the actual modified received signal. After the band-pass filter 710, the IF received signal is picked up by coupler 824 and converted to digital by ADC 826. Canceller controller 828 evaluates the modified digital received signal from the ADC 826 to detect any residual components of the transmit power $P_t$ or the correlated noise $N_c$—either leaked or reflected.

The canceller controller 828 calibrates the true time delay tuners 806 and/or the amplitude tuners 808 as necessary to optimize the cancellation signal's effectiveness against leaked and reflected components of the transmit signal and correlated noise. In the true time delay tuners 806, digital time interpolation filters can be used to achieve 0.1 degree phase accuracy and enable 60 dB suppression of transmit signal interference present in the primary received signal. The digital time interpolation filters can be implemented with a number of control bits needed to achieve pico-second resolution necessary for the required phase accuracy.

In a preferred mode of operation, the calibration described above is performed as a preparatory process before live operations of the STAR subsystem 500. For example, if the STAR subsystem 500 is used in a radar system onboard a military aircraft, the calibration would be performed "pre-mission", or before the aircraft is deployed on a mission. This is because implementation of a real-time feedback loop has consequences in terms of bandwidth limitations. By running open-loop in real time—that is, without tuner adjustments by the canceller control 828—bandwidth limitations are minimized and the wideband performance needed for millimeter-wave operations is achieved. The calibration of the tuners 806 and 808 using the canceller control 828 can be performed pre-mission at different temperatures, and varying other parameters as appropriate, and the tuning values T and a stored in a look-up table, where they can be used during open-loop real-time operations of the STAR subsystem 500.

The STAR subsystem 500 can be implemented with discrete components, as a complete system on a chip, or as any combination thereof. Prototype testing of the STAR subsystem 500 has demonstrated that active cancellation performance of 50 dB or more can be achieved. This level of noise reduction makes millimeter wave simultaneous transmit and receive operation possible, thus enabling the antenna consolidation and other benefits of a STAR system.

Figure 4:
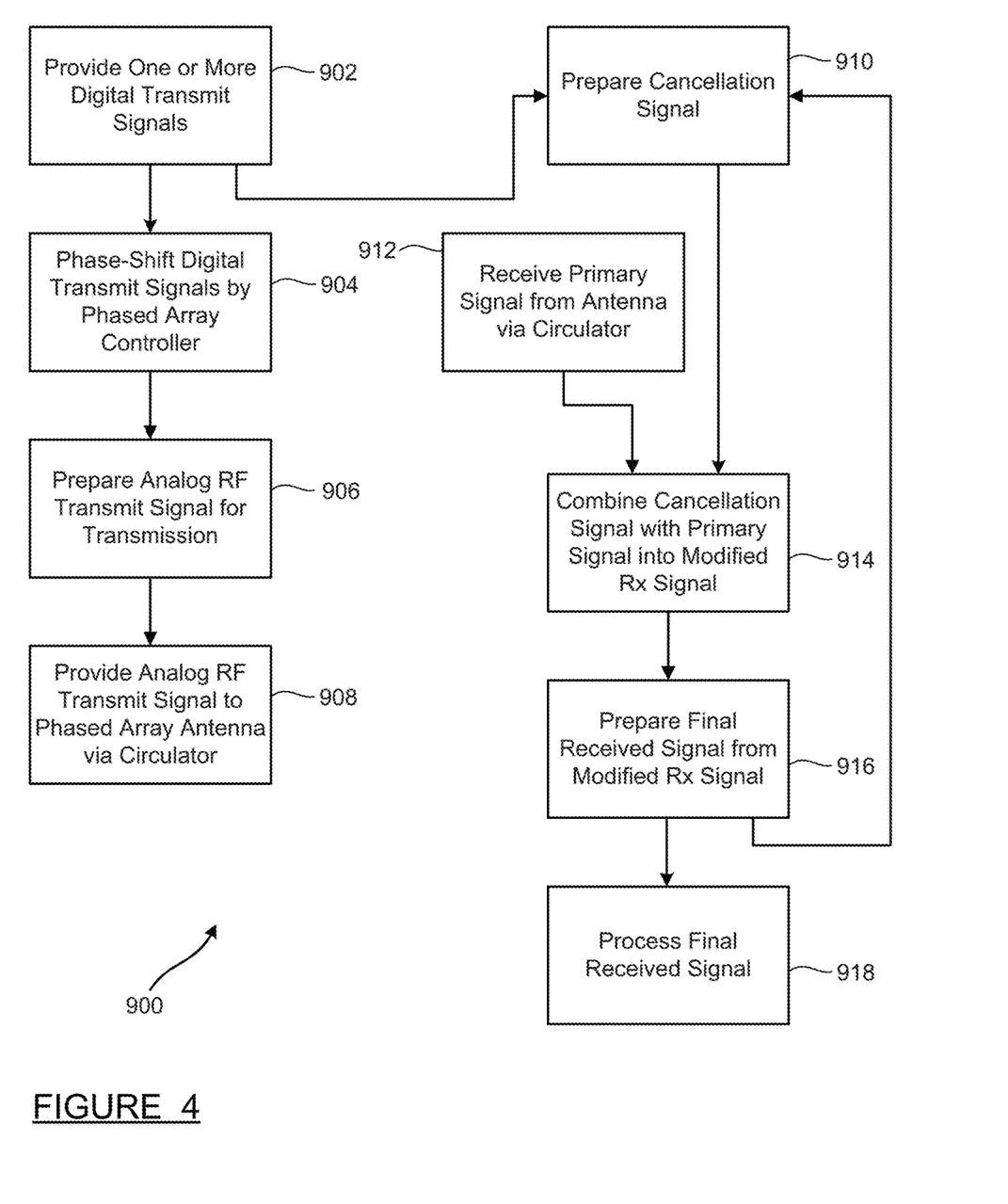
FIG. 4 is a flowchart diagram of a method for cancelling transmit signal interference in a received signal of a STAR system.

FIG. 4 is a flowchart diagram 900 of a method for cancelling interference in a simultaneous transmit and receive (STAR) system. At box 902, one or more digital transmit signals are provided. As discussed above, the signals at the box 902 may include, for example, two transmit signals for a multi-beam radar system. The transmit signals may also carry communications or other data. At box 904, the digital transmit signals, if more than one, are individually phase-shifted by the phased array controller 606. At box 906, the phase-shifted digital transmit signals are prepared for transmission. The steps involved in preparing the phase-shifted digital transmit signals for transmission at the box 906 include summing the one or more signals, converting from digital to analog at intermediate frequency (IF), amplifying, filtering, converting from IF to RF (radio frequency), filtering the RF signal and amplifying the RF signal. The output of the box 906 is an analog RF transmit signal. At box 908, the analog RF transmit signal is provided to the phased array antenna 540 via the circulator 550.

At box 910, the cancellation signal is prepared in the analog canceller 800, using the one or more digital transmit signals as input. As discussed previously, preparing the cancellation signal includes applying the true time delays at the tuners 806, and applying the amplitude scale factors at the tuners 808, to tune the cancellation signal to cancel leaked and reflected components of the transmit signal and correlated noise. The tuners 806 and 808 are applied to leaked and reflected components separately, and to the first and second transmit signals separately. After applying the true time delays and amplitude scale factors, the signals are summed, and then processed in a manner similar to the transmit signal itself—including digital-to-analog conversion, low-pass filtering, up-converting from IF to RF, band-pass filtering, and power amplification.

At box 912, a primary received signal is received from the antenna 540 via the circulator 550. At box 914, the cancellation signal is combined with the primary received signal, to create a modified received signal. As discussed above, the cancellation signal cancels leaked and reflected components of the transmit signal and correlated noise which are present in the primary received signal. At box 916, the receiver 700 prepares a final received signal from the modified received signal, which includes down-converting from RF to IF, digitizing and performing an additional cancellation of leaked and reflected components of uncorrelated noise from the modified received signal. At box 918, the final received signal is provided to the Rx Output terminal 718 where it is processed, for example, by radar analysis software which identifies objects in the final received signal.

From the box 916, feedback in the form of the final received signal is provided to the box 910 where the cancellation signal is prepared. The feedback from the final received signal can be used by the canceller control 828 to identify any residual interference from the transmit signal or correlated noise, and calibrate the true time delay tuners 806 and the amplitude scale factor tuners 808. As discussed above, this feedback and calibration process is preferably performed prior to "live mission" operations of the STAR subsystem 500. After calibration, the STAR subsystem 500 can then be run in open-loop mode, without the feedback loop from the box 916 to the box 910, in order to maximize performance and bandwidth.

Using the STAR subsystem described above, wideband simultaneous transmit and receive operation can be realized without experiencing receiver saturation, and preserving receiver sensitivity to match the performance of a non-STAR system. By cancelling leaked and reflected components of the transmit signal and correlated noise digitally in the time domain, using multiple tuners, extremely effective interference reduction of these components can be achieved. Analog cancellation of non-correlated noise in the frequency domain (in the LNA 704) and a final digital cancellation of noise in the received signal (in the DSP 716/Digital Canceller 450) further improve overall system noise reduction. The off-line tuner calibration capability enables open-loop real-time system operation, thereby providing the wideband performance needed for millimeter wave capability.

The STAR subsystem shown in FIGS. 2 and 3 and described above has been demonstrated to very effectively cancel transmit signal noise out of the received signal. However, other sources of noise—external sources—can also have a significant effect on received signal quality. These external noise sources—which can include intentional unfriendly jamming signals in the case of military radar or communications applications for the STAR subsystem, and may also include unintentional or incidental signals such as those from a nearby television transmission antenna, can be addressed with additional enhancement to the STAR system discussed above.

Figure 5:
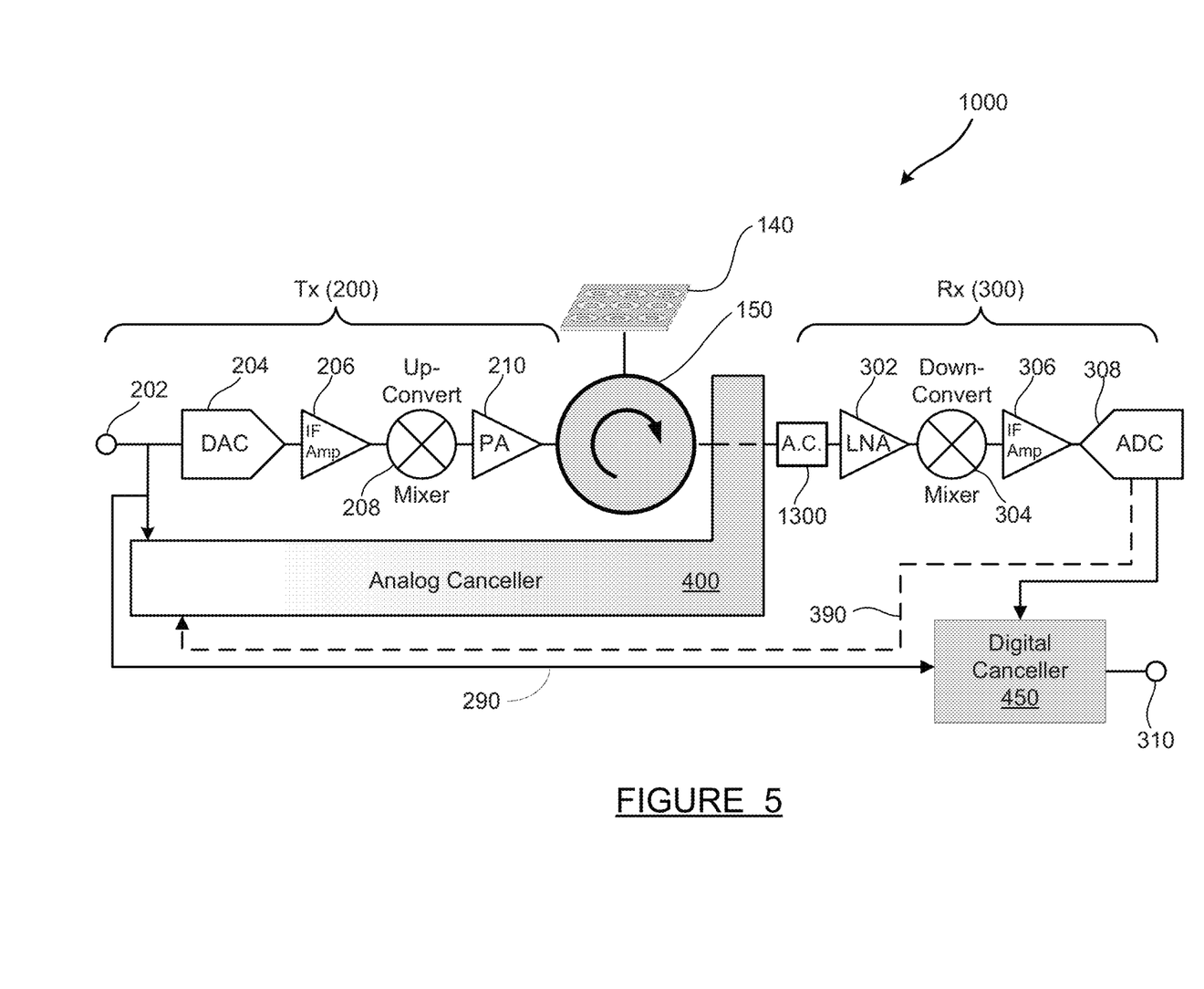
FIG. 5 is a block diagram of the STAR subsystem of FIG. 2 with an active external noise canceller added in the receive circuit.

FIG. 5 is a block diagram of a STAR subsystem 1000 which is the same as the STAR subsystem 100 of FIG. 2 with an external noise active canceller 1300 ("A.C.") added in the receive circuit. The active canceller 1300 provides cancellation of external noise—that is, noise which is not associated with the STAR subsystem's own transmit signal—in the receiver 300. The STAR subsystem 1000, including the analog canceller 400 and the digital canceller 450 described previously, together with the active canceller 1300 discussed in detail below, provides the advantages of simultaneous transmit and receive along with a high quality received signal as a result of three separate cancellers each targeted at and tuned for different types/sources of noise.

Figure 6:
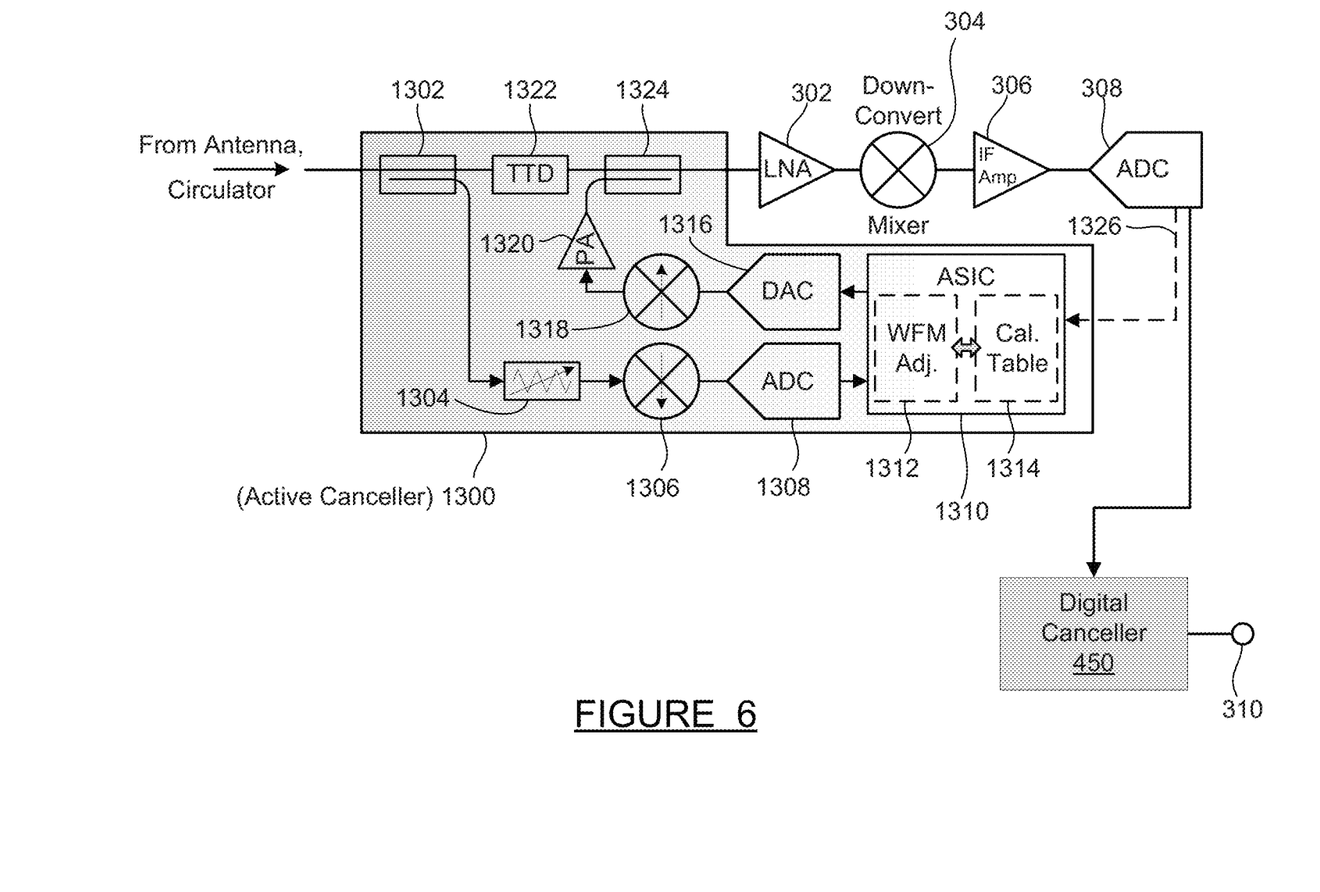
FIG. 6 is a circuit diagram showing details of the external noise canceller which was added in FIG. 5 to the STAR subsystem.

FIG. 6 is a circuit diagram showing details of the active external noise canceller 1300 which was added in FIG. 5 to the STAR subsystem 1000. Referring back to FIG. 5 for a moment, it can be seen that the active canceller 1300 is situated before the low noise amplifier 302 in the receiver circuit 300 of the STAR subsystem 1000. The active canceller 1300 is designed for RF signal input and output, so it is positioned to receive the signal from the antenna 140 via the circulator 150. The remainder of the receiver circuit 300 is also shown in FIG. 6—including the LNA 302, the down-convert mixer 304, IF amplifier 306, the ADC 308 and the output terminal 310, along with the digital canceller 450 discussed previously.

The receiver signal from the antenna 140 and the circulator 150 travels to the active canceller 1300 after first being modified by the analog canceller 400, which cancels out the leaked and reflected components of the transmit signal as discussed previously. The active external noise canceller 1300, which is targeted at external noise, operates independently of the analog canceller 400 and the digital canceller 450. In fact, the active external noise canceller 1300 can be used in receive-only systems where cancellers directed at self-cancellation of transmit-signal noise are not needed.

The receiver signal enters the active canceller 1300 and passes to a coupler 1302 where the signal is split—such that one component of the receiver signal (the "bottom path") is routed through the active canceller circuitry which prepares a cancellation signal based on the noise in the receiver signal, and the other component of the receiver signal (the "top path") passes essentially straight through the active canceller 1300.

From the coupler 1302, the bottom path of the signal passes to a variable attenuator 1304 which attenuates and conditions the signal to a low enough amplitude or power level that the signal can be digitized and processed. For example, the variable attenuator 1304 may need to reduce the receiver signal from 60 dB to 0 dB. A weighted power split may also be used at the coupler 1302, so that the majority of the receiver signal power passes straight through and only a low-power copy of the receiver signal goes to the variable attenuator 1304. By attenuating the receiver signal, the variable attenuator 1304 also pushes the desired receiver signal, which is weak compared to the external noise, down below the noise floor so that the desired signal is effectively absent downstream of the attenuator 1304. From the variable attenuator 1304, the signal passes to a down-convert mixer 1306 which converts the signal from RF to IF. An ADC 1308 then converts the receiver signal, which is still in the time domain and is essentially purely a noise signal, from analog to digital.

A digital signal processor, such as an application specific integrated circuit (ASIC) 1310 then processes the digital receiver (noise) signal to produce a cancellation signal. The ASIC 1310 includes a waveform adjustment module 1312 and a calibration table 1314. The waveform adjustment module 1312 adjusts the cancellation signal so that it is 180 degrees out of phase with the receiver signal on the top path.

That is, after further processing, the cancellation signal leaving the waveform adjustment module 1312 can be combined with the top path receiver signal to cancel a large portion of the external noise. The calibration table 1314 receives feedback from the ADC 308 (modified receiver signal) and communicates with the waveform adjustment module 1312 to fine tune the cancellation signal for optimal effectiveness.

From the ASIC 1310, the external noise cancellation signal is converted back to analog by a DAC 1316, and up-converted back to RF by a mixer 1318. A power amplifier 1320 boosts the power of the cancellation signal to compensate for the attenuation by the variable attenuator 1304. The receiver signal on the top path passes through a true time delay module (TTD) 1322, where a time delay is added to the signal to account for the processing time of the cancellation signal on the lower signal path—particularly the ASIC 1310. The amplified cancellation signal is then injected back into the receiver signal at a coupler 1324, where the cancellation signal reflects the high power external noise in the receiver signal with a phase difference of 180°. Exiting the coupler 1324 and the active canceller 1300, the receiver signal is then processed by the remainder of the receiver circuit 300 as described previously.

The operating principle of the active canceller 1300 is as follows. When large external noise sources are present in the receiver signal—either intentional noise such as a radar or communication jamming signal, or unintentional/incidental noise such as from a nearby broadcast antenna—the external noise can be many orders of magnitude more powerful than the desired receiver signal itself. By creating a cancellation signal from an attenuated form of the receiver signal, the cancellation signal will have a much greater cancellation effect on the noise than on the desired receiver signal—because the noise signal is so much larger to begin with. Thus, after combining the cancellation signal with the receiver signal at the coupler 1324, the output of the active canceller 1300 will have a much smaller dBi delta between the noise and the desired receiver signal. In other words, after the active canceller 1300, the desired receiver signal is much closer to the same power level as the external noise which remains in the signal. This makes the job of downstream components such as the LNA 302 and the ADC 308 much easier, thereby minimizing dynamic range and linearity requirements.

The active canceller 1300 can be used in combination with—or independent of—the analog canceller 400, which creates a cancellation signal targeted at cancelling the STAR subsystem's own transmit signal interference. In contrast, the active canceller 1300 cancels external noise out of the receiver signal. Thus, the active canceller 1300 may be beneficial during times when the STAR subsystem 1000 is operating in a receive-only mode, or even in receive-only systems (non-STAR). Similarly, the active canceller 1300 can be used with, or independent of, the digital canceller 450 which performs a final digital signal processing improvement of the receiver signal.

Figure 7:
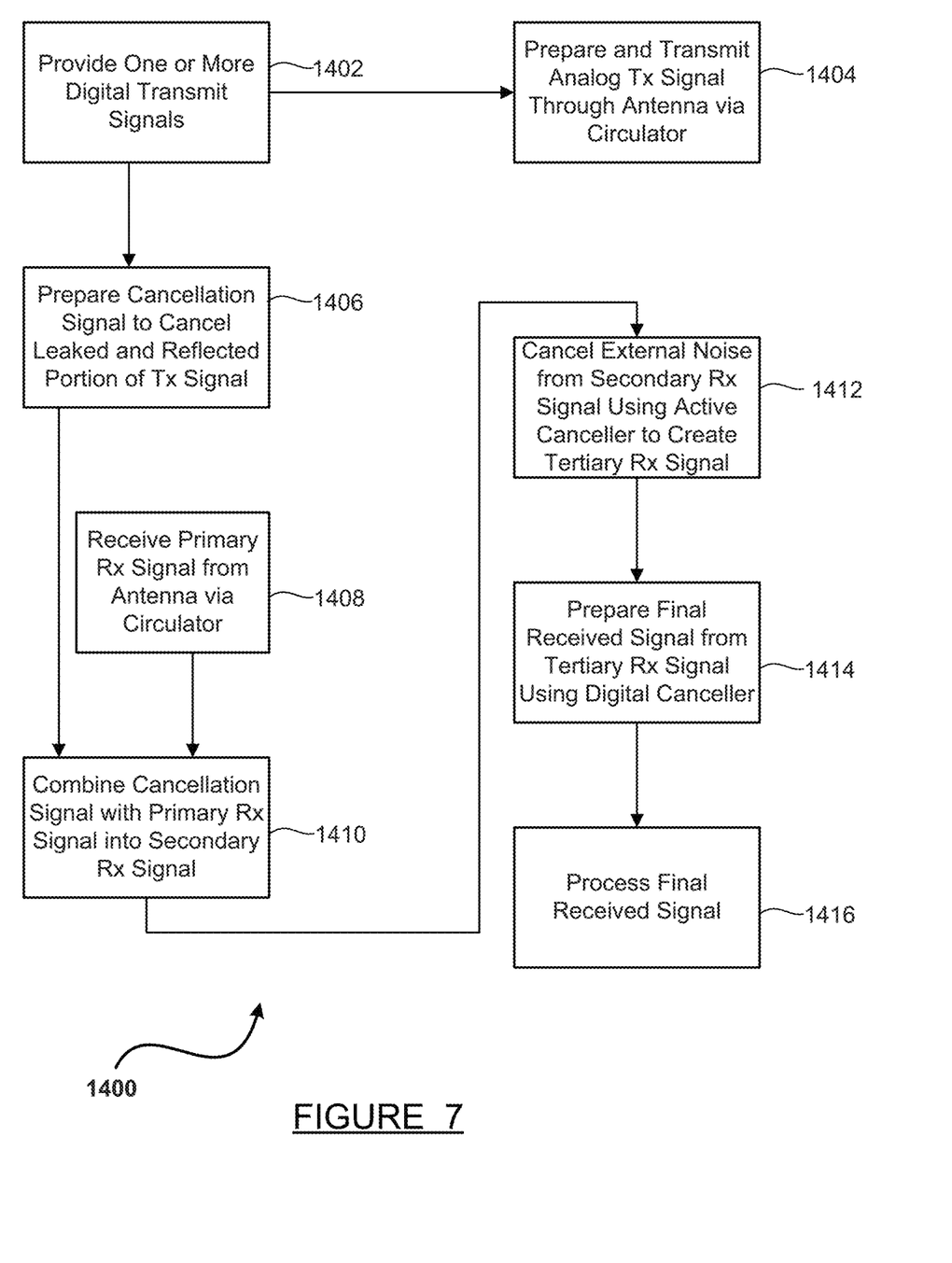
FIG. 7 is a flowchart diagram of a method for improving a received signal in a STAR system by cancelling out transmit signal interference and external noise.

FIG. 7 is a flowchart diagram 1400 of a method for improving a received signal in the STAR subsystem 1000 by cancelling out transmit signal interference, external noise and uncorrelated thermal noise. At box 1402, one or more digital transmit signals are provided by a radar or communications controller. As discussed previously, a phased array controller may be used to direct different radar transmit signals at different elevation angles, for example. At box 1404, the transmit signal(s) are prepared, converted to analog and transmitted from the antenna 140 (or 540) via the circulator 150 (or 550).

At box 1406, a transmit-interference cancellation signal is prepared which is targeted at the leaked and reflected components of the transmit signal. This cancellation signal is prepared by the analog canceller 400, as described in detail previously. At box 1408, a primary receiver signal is received from the antenna 140 via the circulator 150. At box 1410, the transmit-interference cancellation signal is combined with the primary receiver signal in the analog canceller 400, producing a secondary receiver signal. The secondary receiver signal is essentially free of any correlated transmit signal interference due to antenna reflection or circulator leakage.

At box 1412, external noise is cancelled from the secondary receiver signal in the active canceller 1300, producing a tertiary receiver signal. The tertiary receiver signal has dramatically reduced external noise power levels as a result of the active cancellation technique described above. The external noise cancellation at the box 1412 is performed by the active canceller 1300 as shown in FIGS. 5 and 6 and described in the accompanying discussion. At box 1414, uncorrelated thermal noise is cancelled from the tertiary receiver signal in the digital canceller 450, producing a final receiver signal. The final receiver signal can then be processed at box 1416—for example, converted to audio (for communications) or video images (for radar) by a receiver controller. The final receiver signal has dramatically reduced levels of noise and interference as a result of the three cancellation techniques described above.

The active external noise canceller 1300 provides valuable additional STAR subsystem capability which, when combined with transmit-signal interference cancellation, delivers a simultaneous transmit and receive system with superior performance in all phases of operation.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A simultaneous transmit and receive (STAR) system with self-cancellation of transmit signal interference and external noise cancellation, said system comprising:
   an antenna aperture;
   a transmitter circuit for transmitting signals over a frequency band through the antenna aperture;
   a receiver circuit for receiving signals from the antenna aperture, where the receiver circuit uses the same frequency band as the transmitter circuit at the same time;
   a circulator for directing transmit signals from the transmitter circuit to the antenna aperture and a received signal from the antenna aperture to the receiver circuit;
   a transmit signal self-canceller circuit including a plurality of tuners that operate on the transmit signals and digitally synthesize a self-cancellation signal which is applied to the received signal, where the self-cancellation signal cancels out components which are present in the received signal due to antenna reflection and circulator leakage of the transmit signals and correlated noise, and where the plurality of tuners include true time delay tuners which apply a true time delay to a leakage component and a reflection component of each of one or more digital transmit signals, and amplitude tuners which apply an amplitude scale factor to the leakage component and the reflection component of each of the digital transmit signals; and an external noise canceller circuit including a signal processor which applies a 180 degree phase offset to a digitized form of the received signal to synthesize a noise cancellation signal which is converted to analog and applied to the received signal, where the noise cancellation signal decreases external noise power in the received signal.

2. The system of claim 1 wherein the self-canceller circuit includes the tuners which synthesize the self-cancellation signal, a summer which sums components of the self-cancellation signal from all of the tuners, a digital to analog converter, a low-pass filter, a mixer for up-converting from intermediate frequency to radio frequency, a band-pass filter and a power amplifier.

3. The system of claim 1 wherein the true time delays are calculated based on expected elapsed times for leaked and reflected signals to travel from the transmitter circuit to the receiver circuit, and the amplitude scale factors are calculated based on a transmission coefficient of the circulator and a reflection coefficient of the antenna aperture.

4. The system of claim 3 further comprising a feedback loop from the receiver circuit to the self-canceller circuit for separately calibrating the true time delays and the amplitude scale factors for the leakage components and the reflection components, where calibration values for the true time delays and the amplitude scale factors, at a range of temperatures, are stored in a look-up table, and the calibration values from the look-up table are used during operations of the system.

5. The system of claim 1 wherein the external noise canceller circuit includes a first coupler which splits the received signal into a first path and a second path, where the first path includes the signal processor which synthesizes the noise cancellation signal, and a second coupler which injects the noise cancellation signal into the received signal.

6. The system of claim 5 wherein the first coupler applies a weighted split of power of the received signal, where over half of the power of the received signal passes through the second path and a low-power copy of the received signal passes through the first path.

7. The system of claim 5 wherein the first path includes a variable attenuator which attenuates the received signal in the first path, an RF-IF down-converter, an analog-to-digital converter (ADC), the signal processor, a digital-to-analog converter (DAC), an IF-RF up-converter, and an amplifier.

8. The system of claim 7 wherein the signal processor is an application specific integrated circuit (ASIC) including a waveform adjustment module and a calibration table, where the waveform adjustment module applies the 180 degree phase offset to the received signal to produce the noise cancellation signal.

9. The system of claim 8 further comprising a feedback loop from the receiver circuit to the calibration table, where the waveform adjustment module makes adjustments to the noise cancellation signal to reduce noise in the received signal detected via the feedback loop.

10. The system of claim 5 wherein the second path includes a true time delay module which adds a time delay to the received signal in the second path to compensate for a processing time of the signal processor.

11. The system of claim 1 wherein the system is a multi-beam electronically steerable phased array antenna radar system.

12. A radio receiver system with external noise cancellation, said receiver system comprising:

an external noise canceller circuit including a first coupler which splits a received signal from an antenna into a first path and a second path, where the first path includes a signal processor which applies a 180-degree phase offset to a digitized form of the received signal to synthesize a noise cancellation signal, and a second coupler which injects the noise cancellation signal into a time-delayed form of the received signal from the second path to produce a modified received signal; and a receiver circuit which receives the modified received signal from the external noise canceller circuit, said receiver circuit including a low noise amplifier, a radio frequency to intermediate frequency (RF-IF) down-converter, an IF amplifier, and an analog-to-digital converter (ADC), where the receiver circuit provides a digital receiver output signal.

13. The receiver system of claim 12 wherein the first coupler applies a weighted split of power of the received signal, where over half of the power of the received signal passes through the second path and a low-power copy of the received signal passes through the first path.

14. The receiver system of claim 12 wherein the first path includes a variable attenuator which attenuates the received signal in the first path, an RF-IF down-converter, an ADC, the signal processor, a digital-to-analog converter (DAC), an IF-RF up-converter, and a power amplifier, where the signal processor is an application specific integrated circuit (ASIC) including a waveform adjustment module and a calibration table, and where the waveform adjustment module applies the 180-degree phase offset and other adjustments designated by the calibration table to the received signal to produce the noise cancellation signal.

15. The receiver system of claim 14 further comprising a feedback loop coupling the digital receiver output signal from the receiver circuit to the calibration table of the signal processor, where the waveform adjustment module makes further adjustments to the noise cancellation signal to minimize noise in the modified received signal detected via the feedback loop.

16. A method for cancelling interference in a simultaneous transmit and receive (STAR) system, said method comprising:

providing one or more digital transmit signals to a transmitter circuit;

creating, by the transmitter circuit, an analog transmit signal for transmission from the digital transmit signals;

providing the analog transmit signal to a phased array antenna via a circulator;

preparing, in a self-canceller circuit, a self-cancellation signal from the digital transmit signals, including applying a true time delay to a leakage component and a reflection component of each of the digital transmit signals, applying an amplitude scale factor to the leakage component and the reflection component of each of the digital transmit signals, and summing the leakage components and the reflection components after the true time delays and the amplitude scale factors have been applied;

receiving a primary received signal from the antenna via the circulator;

combining the self-cancellation signal with the primary received signal into a secondary received signal;

preparing, in an external noise canceller circuit, a noise cancellation signal by applying a 180 degree phase offset to a digitized form of the secondary received signal;

combining the noise cancellation signal with the secondary received signal to produce a tertiary received signal, where the noise cancellation signal decreases external noise power in the tertiary received signal; and cancelling, in a receiver circuit, leaked and reflected components of uncorrelated transmit signal noise from the tertiary received signal to create a final received signal.

17. The method of claim 16 wherein the external noise canceller circuit includes a first coupler which splits the secondary received signal into a first path and a second path, where the first path includes a signal processor which synthesizes the noise cancellation signal, and a second coupler which injects the noise cancellation signal into the secondary received signal to produce the tertiary received signal.

18. The method of claim 17 wherein the first path includes a variable attenuator which attenuates the secondary received signal in the first path, an RF-IF down-converter, an analog-to-digital converter (ADC), the signal processor, a digital-to-analog converter (DAC), an IF-RF up-converter, and an amplifier, and the second path includes a true time delay module which adds a time delay to the secondary received signal in the second path to compensate for a processing time of the signal processor.

19. The method of claim 17 wherein the signal processor is an application specific integrated circuit (ASIC) including a waveform adjustment module and a calibration table, where the waveform adjustment module applies the 180 degree phase offset to the secondary received signal to produce the noise cancellation signal.

20. The method of claim 19 further comprising a feedback loop from the receiver circuit to the calibration table, where the waveform adjustment module makes adjustments to the noise cancellation signal to reduce noise in the tertiary received signal detected via the feedback loop.

\* \* \* \* \*